(12) United States Patent
Enomoto

(10) Patent No.: US 11,835,048 B2
(45) Date of Patent: Dec. 5, 2023

(54) VACUUM PUMP DEVICE AND LIFTING-TYPE GATE VALVE

(71) Applicant: Edwards Japan Limited, Chiba (JP)

(72) Inventor: Yoshihiro Enomoto, Chiba (JP)

(73) Assignee: Edwards Japan Limited, Chiba (JP)

( * ) Notice: Subject to any disclaimer, the term of this patent is extended or adjusted under 35 U.S.C. 154(b) by 0 days.

(21) Appl. No.: 17/624,645

(22) PCT Filed: Jul. 3, 2020

(86) PCT No.: PCT/JP2020/026286
§ 371 (c)(1),
(2) Date: Jan. 4, 2022

(87) PCT Pub. No.: WO2021/006224
PCT Pub. Date: Jan. 14, 2021

(65) Prior Publication Data
US 2022/0260079 A1 Aug. 18, 2022

(30) Foreign Application Priority Data

Jul. 11, 2019 (JP) ................. 2019-129673

(51) Int. Cl.
*F04D 19/04* (2006.01)
*F16K 1/42* (2006.01)
*F16K 41/10* (2006.01)

(52) U.S. Cl.
CPC .......... *F04D 19/04* (2013.01); *F16K 1/42* (2013.01); *F16K 41/10* (2013.01)

(58) Field of Classification Search
CPC ........... F04D 19/04; F04D 19/042; F16K 1/38
See application file for complete search history.

(56) References Cited

U.S. PATENT DOCUMENTS 6,189,482 B1 * 2/2001 Zhao ............... H01J 37/3244
                                         118/724
2013/0263955 A1 * 10/2013 Hirota ............... F16K 11/10
                                         137/636

(Continued)

FOREIGN PATENT DOCUMENTS

JP       H1162881 A     3/1999
JP       H1193889 A     4/1999

(Continued)

OTHER PUBLICATIONS

PCT International Search Report dated Aug. 25, 2020 for corresponding PCT application Serial No. PCT/JP2020/026286, 2 pages.

(Continued)

*Primary Examiner* — Long T Tran
(74) *Attorney, Agent, or Firm* — Theodore M. Magee; Westman, Champlin & Koehler, P.A.

(57) ABSTRACT

Uniform exhaustion can be realized with a relatively simple structure in a vacuum pump device.

A vacuum pump portion includes an outer rotor and an inner stator, a lifting-type gate valve portion includes a valve body and a valve seat, and the valve body is lifted/lowered with respect to the valve seat along a rotating shaft direction. And the inner stator includes a through hole along the rotating shaft direction of the vacuum pump portion, and at least a part of a supporting member which supports the valve body is disposed in the through hole.

9 Claims, 4 Drawing Sheets

(56) References Cited

U.S. PATENT DOCUMENTS

2014/0291562 A1* 10/2014 Ooe .................. F25B 41/35
　　　　　　　　　　　　　　　　　　　　　251/129.11
2016/0341336 A1* 11/2016 Harada ............... F25B 41/35
2020/0158115 A1*  5/2020 Mei .................. F04D 15/0005

FOREIGN PATENT DOCUMENTS

JP　　　2001304173 A　　10/2001
JP　　　2003071271 A　　 3/2003

OTHER PUBLICATIONS

PCT International Written Opinion dated Aug. 25, 2020 for corresponding PCT application Serial No. PCT/JP2020/026286, 4 pages.

* cited by examiner

VACUUM PUMP DEVICE AND LIFTING-TYPE GATE VALVE

CROSS-REFERENCE OF RELATED APPLICATION

This application is a Section 371 National Stage Application of International Application No. PCT/JP2020/026286, filed Jul. 3, 2020, which is incorporated by reference in its entirety and published as WO 2021/006224A1 on Jan. 14, 2021 and which claims priority of Japanese Application No. 2019-129673, filed Jul. 11, 2019.

BACKGROUND

The present invention relates to a vacuum pump device and a lifting-type gate valve.

On a lower part of a process chamber such as a semiconductor manufacturing device, for example, a gate valve and a vacuum pump device are provided in order to adjust a pressure in the chamber.

A vacuum pump device includes a lifting-type gate valve for lifting/lowering a valve body in a rotating shaft direction (See Japanese Patent Application Publication No. (H)11-62881, for example).

The discussion above is merely provided for general background information and is not intended to be used as an aid in determining the scope of the claimed subject matter. The claimed subject matter is not limited to implementations that solve any or all disadvantages noted in the background.

SUMMARY

When a gate valve is in an open state, regardless of an opening degree of the gate valve, a gas in a chamber is preferably exhausted uniformly in a circumferential direction. Thus, it is preferable that a structural member which would inhibit a flow of the gas non-uniformly in the circumferential direction is not disposed but a supporting member that supports a valve body is disposed at a center part of the vacuum pump.

However, if such a supporting member is to be disposed at the center part of the vacuum pump, facility or a structure for sealing so that a gas does not leak from a gap between a rotor and the supporting member of a vacuum pump device is needed as in the above-described vacuum pump device and thus, the structure of the vacuum pump device becomes complicated.

The present invention was made in view of the above-described problem and has an object to obtain a vacuum pump device and a lifting-type gate valve capable of realizing uniform exhaustion with a relatively simple structure.

A vacuum pump device according to the present invention includes a vacuum pump portion including a rotor and a stator and a lifting-type gate valve portion including a valve body and a valve seat, in which the valve body is lifted/lowered with respect to the valve seat along a rotating shaft direction of the vacuum pump portion. And the stator includes a through hole along the rotating shaft direction of the vacuum pump portion, and at least a part of a supporting member which supports the valve body or the valve seat is disposed in the through hole.

A lifting-type gate valve according to the present invention includes a substantially cylindrical valve body disposed on an outer side of a vacuum pump, a substantially disc-shaped valve seat, and a supporting member which supports the valve seat. And at least a part of the supporting member is disposed in a through hole of the stator of the vacuum pump.

According to the present invention, a vacuum pump device and a lifting-type gate valve capable of realizing uniform exhaustion with a relatively simple structure can be obtained.

The above and the other objects, features, and advantages of the present invention will be made more apparent from attached drawings and detailed description below.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION

Hereinafter, embodiments of the present invention will be described on the basis of drawings.

Embodiment 1

Figure 1:
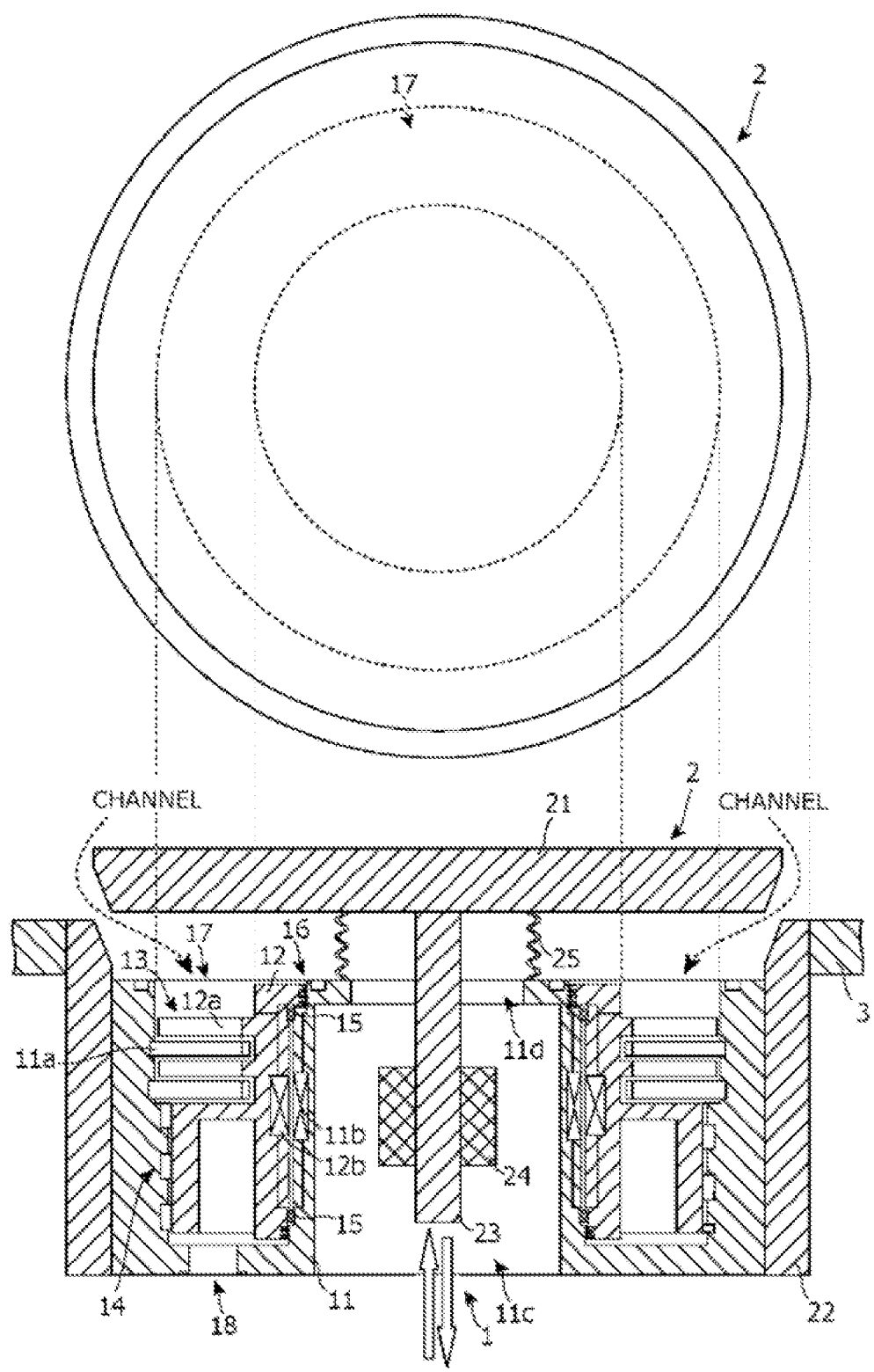
FIG. 1 is a sectional view illustrating a structure of a vacuum pump device according to an embodiment 1 of the present invention.

FIG. 1 is a sectional view illustrating a structure of a vacuum pump device according to an embodiment 1. The vacuum pump device illustrated in FIG. 1 includes a vacuum pump portion 1 and a lifting-type gate valve portion 2.

The vacuum pump portion 1 includes an inner stator 11 and an outer rotor 12. The inner stator 11 includes a stator blade 11a, while the outer rotor 12 includes a rotor blade 12a. The stator blade 11a and the rotor blade 12a constitute a turbo-molecular pump portion 13, and a thread-groove pump portion 14 is formed on a rear stage of the turbo-molecular pump portion 13. It is to be noted that the thread-groove pump portion 14 does not have to be formed.

Moreover, a coil 11b is provided in the inner stator 11, a coil 12b is provided in the outer rotor 12, the coils 11b and 12b form a motor, and this motor rotates the outer rotor 12. Furthermore, in either one of or both of the inner stator 11 and the outer rotor 12, a bearing 15 and a sealing portion 16 are provided.

An inlet port 17 on an upper end of the vacuum pump portion 1 has a substantially annular shape and has a substantially uniform width in a circumferential direction. A gas molecule flowing through the inlet port 17 is exhausted by the vacuum pump portion 1 from an outlet port 18 on a lower part.

Furthermore, the inner stator 11 includes a through hole 11c along a rotating shaft direction of the vacuum pump portion 1 (that is, a rotating shaft of the outer rotor 12 and a center axis of the inner stator 11). That is, the inner stator 11 is disposed at a center of the vacuum pump portion 1, and the through hole 11c is formed at a center of the inner stator 11.

On the other hand, the lifting-type gate valve portion 2 includes a valve body 21 and a valve seat 22, and the valve body 21 is lifted/lowered with respect to the valve seat 22 along the rotating shaft direction of the vacuum pump portion 1. The valve seat 22 is capable of being connected to a chamber 3.

And in the embodiment 1, at least a part of a supporting member 23 which supports the valve body 21 is disposed in the through hole 11c.

Specifically, the columnar supporting member 23 is connected to substantially the center of the substantially disc-shaped valve body 21 and extends through the through hole 11c via an upper opening portion 11d in the center part of the inner stator 11.

And a lifting device 24 is disposed in the through hole 11c, and the lifting device 24 lifts/lowers the supporting member 23. For example, the supporting member 23 and the lifting device 24 are actuators such as shaft motors, and the lifting device 24 is electrically controlled and lifts/lowers the supporting member 23 by an electromagnetic force, whereby the valve body 21 is lifted/lowered.

Moreover, a bellows 25 capable of expansion/contraction in the rotating shaft direction is provided between the valve body 21 and the inner stator 11, and the bellows 25 has a substantially cylindrical bellows shape and airtightly seals the upper opening portion 11d of the through hole 11c.

When the valve body 21 is lowered by the lifting device 24 and is brought into contact with the valve seat 22, the lifting-type gate valve portion 2 is brought into a closed state, while when the valve body 21 is lifted by the lifting device 24 and is separated from the valve seat 22, the lifting-type gate valve portion 2 is brought into an open state, and moreover, by adjusting a position of the valve body 21 by the lifting device 24, an opening degree of the lifting-type gate valve portion 2 is adjusted.

Moreover, an opening portion of the valve seat 22 has a shape conforming to a shape of the valve body 21, and when the lifting-type gate valve portion 2 is in the closed state, there is no gap any more between the valve body 21 and the valve seat 22, while when the lifting-type gate valve portion 2 is in the open state, a channel width between the valve body 21 and the valve seat 22 is substantially uniform in the circumferential direction. As a result, uniform exhaustion is realized.

Subsequently, an operation of the vacuum pump device according to the embodiment 1 will be described.

The vacuum pump device is connected to the chamber 3, and a control device, not shown, controls the lifting device 24 so as to lift or lower the valve body 21 and adjusts the opening degree of the lifting-type gate valve portion 2. At this time, the bellows 25 is expanded/contracted in accordance with lifting/lowering of the valve body 21.

When the lifting-type gate valve portion 2 is in the open state, a periphery of the disc-shaped valve body 21 is open, and a gas channel which is uniform in the circumferential direction is formed up to the inlet port 17, which is uniform in the circumferential direction.

As a result, uniform exhaustion is realized by the vacuum pump portion 1.

For example, when a disc-shaped stage is disposed above the valve body 21, and an object to be processed is placed on the stage, gas pressure distribution in the periphery is substantially uniform in the circumferential direction, and the gas which becomes unnecessary in the process in the chamber 3 is uniformly exhausted by the vacuum pump portion 1.

As described above, according to the above-described embodiment 1, the vacuum pump portion 1 includes the outer rotor 12 and the inner stator 11, the lifting-type gate valve portion 2 includes the valve body 21 and the valve seat 22, and the valve body 21 is lifted/lowered with respect to the valve seat 22 along the rotating shaft direction of the vacuum pump portion 1. And the inner stator 11 includes the through hole 11c along the rotating shaft direction of the vacuum pump portion 1, and at least a part of the supporting member 23 which supports the valve body 21 is disposed in the through hole 11c.

As a result, since the supporting member 23 can be disposed at the center part of the vacuum pump portion 1 by forming the through hole 11c in the inner stator 11 which is not rotated, uniform exhaustion is realized with a relatively simple structure.

Embodiment 2

In a vacuum pump device according to an embodiment 2, a structure of the turbo-molecular pump portion 13 of the vacuum pump portion 1 is different from that of the embodiment 1.

Figure 2:
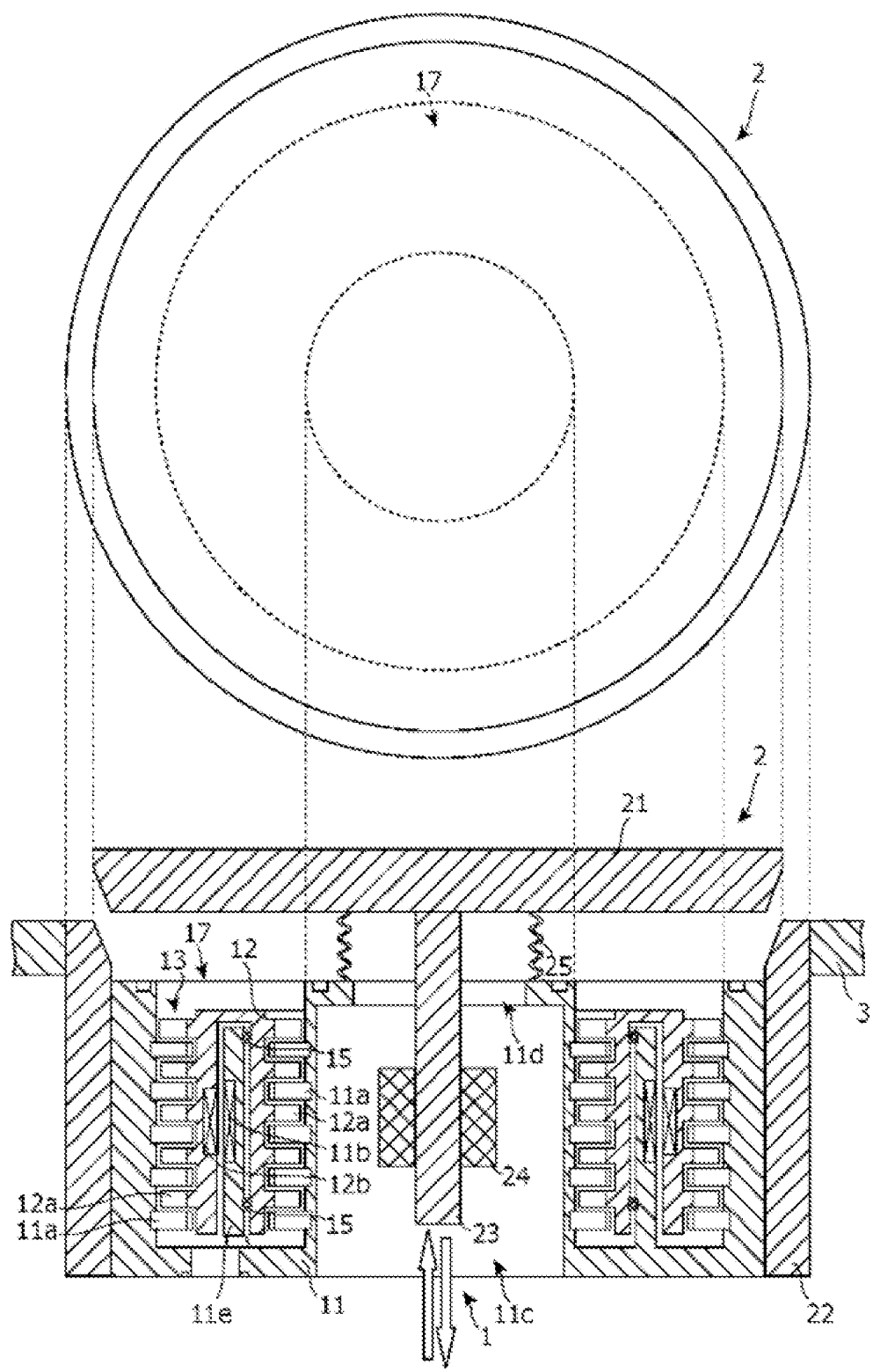
FIG. 2 is a sectional view illustrating a structure of a vacuum pump device according to an embodiment 2 of the present invention.

FIG. 2 is a sectional view illustrating the structure of the vacuum pump device according to the embodiment 2 of the present invention. As illustrated in FIG. 2, in the embodiment 2, the inner stator 11 includes an intermediate cylinder 11e, the stator blade 11a and the rotor blade 12a are disposed both on an inner peripheral side and an outer peripheral side of the intermediate cylinder 11e, and a sealing portion as the sealing portion 16 in the embodiment 1 is not provided.

Since the other structures and operations of the vacuum pump device according to the embodiment 2 are similar to those of the embodiment 1, explanation thereof will be omitted.

Embodiment 3

Figure 3:
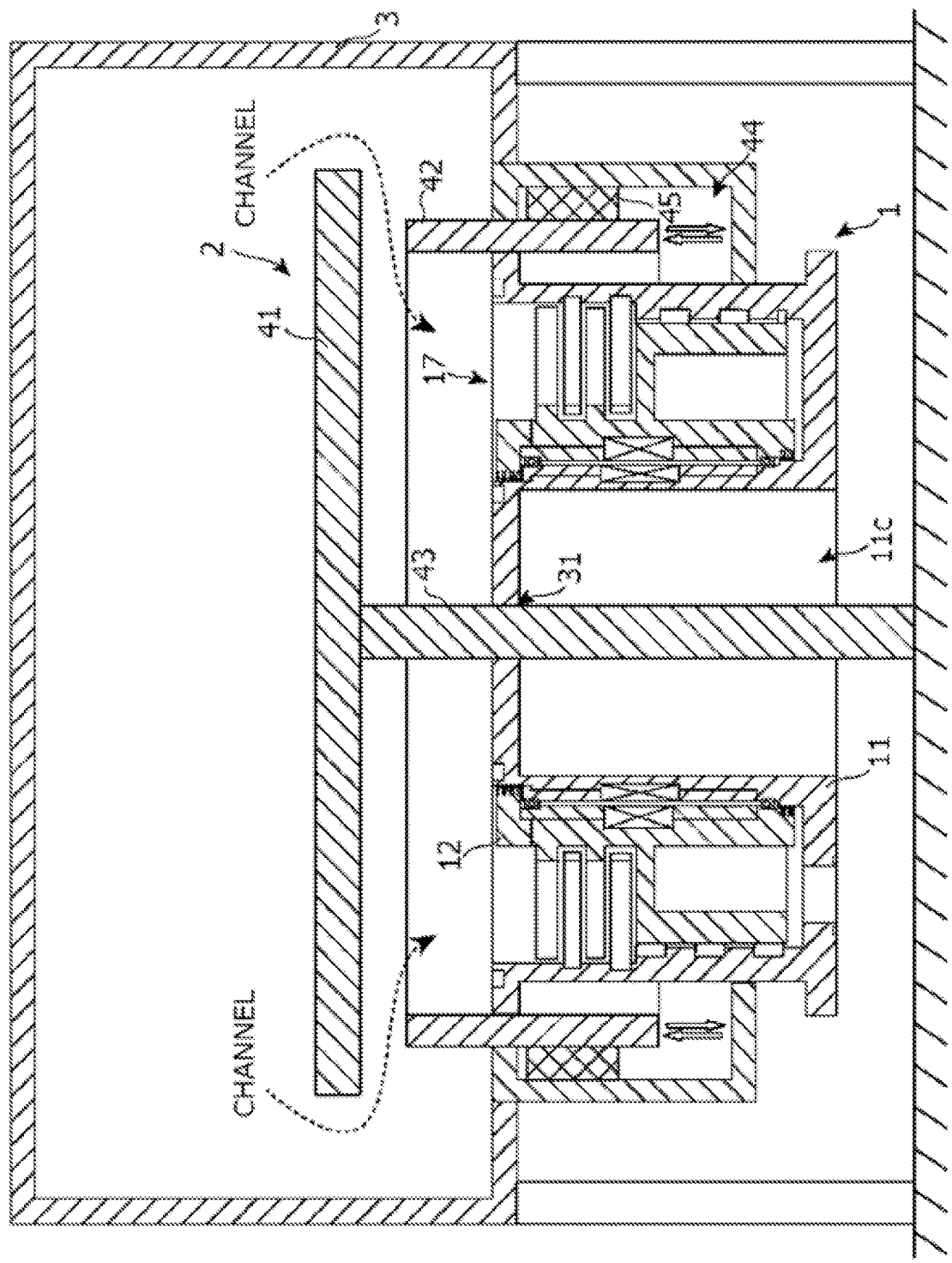
FIG. 3 is a sectional view illustrating a structure of a vacuum pump device according to an embodiment 3 of the present invention.

FIG. 3 is a sectional view illustrating a structure of the vacuum pump device according to the embodiment 3 of the present invention.

As illustrated in FIG. 3, in the lifting-type gate valve portion 2 in the embodiment 3, a valve seat 41 is substantially disc-shaped, a valve body 42 has a substantially cylindrical shape, a supporting member 43 which supports the valve seat 41 is connected to a substantial center of the valve seat 41, and at least a part of the supporting member 43 is disposed in the through hole 11c of the inner stator 11. The through hole 11c includes an upper opening portion 31, the supporting member 43 penetrates the upper opening portion 31 of the through hole 11c, the supporting member 43 is not lifted/lowered but fixed, and a gap between a wall surface of the upper opening portion 31 and the supporting member 43 is fixedly and airtightly sealed.

Moreover, in this embodiment 3, the valve seat 41 is used as a stage disposed in the chamber 3.

And in the embodiment 3, the valve body 42 is disposed on the outer side of the vacuum pump portion 1 and is lifted/lowered along the rotating shaft direction of the vacuum pump portion 1.

Moreover, on an outer peripheral part of the vacuum pump portion 1, an outer-peripheral accommodating portion 44 capable of accommodating the valve body 42 is provided, and a lifting device 45 which lifts/lowers the valve body 42 is provided in the outer-peripheral accommodating portion 44.

The lifting device 45 is electrically controlled and is an actuator which lifts/lowers the valve body 42 by an electromagnetic force with a principle similar to that of a shaft motor, for example.

In this embodiment 3, when the valve body 42 is lifted by the lifting device 45 and is brought into contact with the valve seat 41, the lifting-type gate valve portion 2 is brought into a closed state, while when the valve body 42 is lowered by the lifting device 45 and is separated from the valve seat 41, the lifting-type gate valve portion 2 is brought into an open state, and moreover, by adjusting a position of the valve body 42 by the lifting device 45, an opening degree of the lifting-type gate valve portion 2 is adjusted.

It is to be noted that, it may be constituted such that a contact surface between the valve seat 41 and the valve body 42 is tapered by providing a protrusion on a bottom surface of the valve seat 41. Moreover, it may be also constituted such that the lifting-type gate valve portion 2 is brought into the closed state by closing a channel by contact of the valve body 42 with a side surface of the valve seat 41. In that case, too, the contact surface between the valve seat 41 and the valve body 42 may be tapered.

Moreover, an upper opening portion of the valve body 42 has a shape conforming to a shape of the valve seat 41 (in this embodiment, a shape of the bottom surface of the valve seat 41, that is, a plane, here), and when the lifting-type gate valve portion 2 is in the closed state, there is no gap any more between the valve seat 41 and the valve body 42, while when the lifting-type gate valve portion 2 is in the open state, a channel width between the valve seat 41 and the valve body 42 is substantially uniform in the circumferential direction.

As a result, uniform exhaustion is realized.

It is to be noted that the structure of the vacuum pump portion 1 in the embodiment 3 is similar to that of the embodiment 1. Moreover, the structure of the vacuum pump portion 1 in the embodiment 3 may be similar to that of the embodiment 2.

Subsequently, an operation of the vacuum pump device according to the embodiment 3 will be described.

A control device, not shown, electrically controls the lifting device 45 so as to lift or lower the valve body 42 and adjusts the opening degree of the lifting-type gate valve portion 2.

When the lifting-type gate valve portion 2 is in the open state, a periphery of the valve seat 41 which is a disc-shaped stage is open, and a gas channel which is uniform in the circumferential direction is formed up to the inlet port 17, which is uniform in the circumferential direction. As a result, uniform exhaustion is realized by the vacuum pump portion 1.

That is, gas pressure distribution in the periphery of the valve seat 41 as a stage becomes substantially uniform in the circumferential direction, and the gas which became unnecessary in a process in the chamber 3 is uniformly exhausted by the vacuum pump portion 1.

As described above, according to the above-described embodiment 3, the vacuum pump portion 1 includes the outer rotor 12 and the inner stator 11, the lifting-type gate valve portion 2 includes the valve body 42 and the valve seat 41, and the valve body 42 is lifted/lowered with respect to the valve seat 41 along the rotating shaft direction of the vacuum pump portion 1. And the inner stator 11 includes the through hole 11c along the rotating shaft direction of the vacuum pump portion 1, and at least a part of the supporting member 43 which supports the valve seat 41 is disposed in the through hole 11c.

As a result, since the supporting member 43 can be disposed at a center part of the vacuum pump portion 1 by forming the through hole 11c in the inner stator 11 which is not rotated, uniform exhaustion is realized with a relatively simple structure.

Embodiment 4

Figure 4:
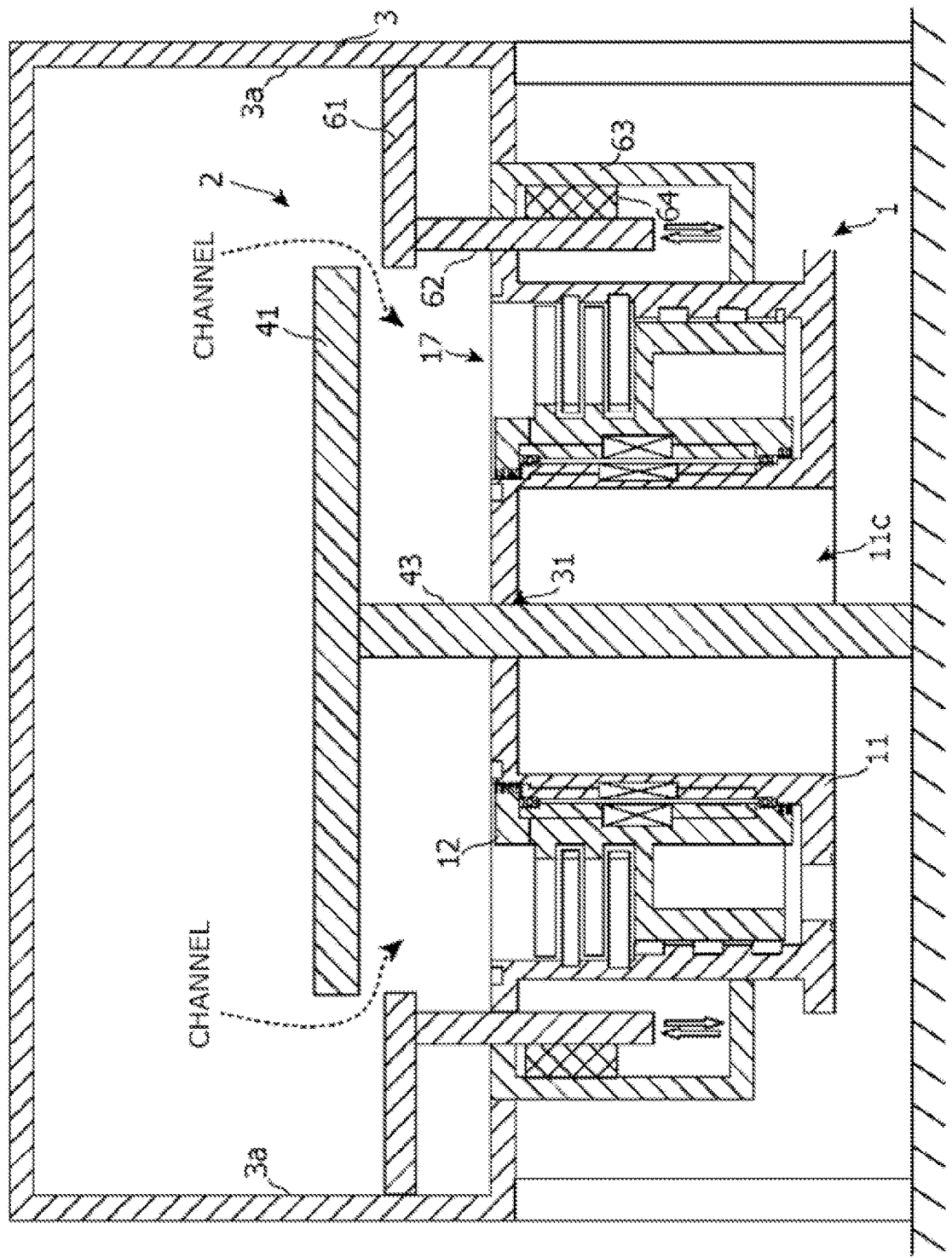
FIG. 4 is a sectional view illustrating a structure of a vacuum pump device according to an embodiment 4 of the present invention.

FIG. 4 is a sectional view illustrating a structure of a vacuum pump device according to an embodiment 4 of the present invention.

In the embodiment 4, the lifting-type gate valve portion 2 includes a valve body 61 having a substantially annular shape and also includes the valve seat 41 and the supporting member 43 similar to the embodiment 3.

Moreover, on an outer peripheral part of the vacuum pump portion 1, an outer-peripheral accommodating portion 63 capable of accommodating a supporting member 62 of the valve body 61 is provided, and a lifting device 64 which lifts/lowers the supporting member 62, that is, the valve body 61, is provided in the outer-peripheral accommodating portion 63. The supporting member 62 and the lifting device 64 are shaft motors, for example, and the lifting device 64 is an actuator which is electrically controlled so as to lift/lower the supporting member 62 by an electromagnetic force.

In the embodiment 4, the valve body 61 is disposed on an outer side of the vacuum pump portion 1 and is lifted/lowered along the rotating shaft direction of the vacuum pump portion 1, and when it is lifted, it is brought into contact with the valve seat 41 and an inner wall 3a of the chamber 3 and closes a gas channel. A contact surface between the valve seat 41 and the valve body 61 may be tapered. Similarly, it may be so constituted that a protrusion is provided on the inner wall 3a of the chamber 3, and a contact surface between the inner wall 3a of the chamber 3 and the valve body 61 is tapered.

Moreover, when the valve body 61 is lowered, and the lifting-type gate valve portion 2 is in the open state, a channel width between the valve seat 41 and the valve body 61 is substantially uniform in the circumferential direction. As a result, uniform exhaustion is realized.

It is to be noted that the other structures and operations of the vacuum pump device according to the embodiment 4 are similar to those of the embodiment 3 and thus, explanation thereof will be omitted.

It is to be noted that various changes and modifications of the above-described embodiments are apparent to those skilled in the art. Such changes and modifications may be performed without departing from a gist and a range of objects thereof and without weakening intended advantages. That is, it is intended that such changes and modifications are included in the claims.

For example, the vacuum pump devices according to the above-described embodiments 1 to 4 are outer-rotor type vacuum pump devices, but inner-rotor type vacuum pump devices may be applicable.

The present invention can be applied to a vacuum pump device, for example.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

What is claimed is:

1. A vacuum pump device comprising:
a vacuum pump portion including an inlet, a rotor and a stator; and a lifting-type gate valve portion including a valve body and a valve seat, in which the valve body is lifted/lowered with respect to the valve seat along a rotating shaft direction of the vacuum pump portion, wherein
the stator includes a through hole along the rotating shaft direction of the vacuum pump portion;
at least a part of a supporting member which supports the valve body or the valve seat is disposed in the through hole; and
a seal is positioned between the through hole and the inlet to prevent gas molecules at the inlet from entering the through hole at an upper opening portion of the through hole.

2. The vacuum pump device according to claim 1, wherein
at least a part of the supporting member which supports the valve body is disposed in the through hole.

3. The vacuum pump device according to claim 2, wherein the seal comprises:
a substantially cylindrical bellows which is provided between the valve body and the stator and airtightly seals the upper opening portion of the through hole.

4. The vacuum pump device according to claim 2, further comprising:
a lifting device which lifts/lowers the supporting member, wherein
the supporting member is connected to a substantial center of the valve body; and
the lifting device is disposed in the through hole.

5. The vacuum pump device according to claim 1, wherein
the valve seat is substantially disc-shaped;
at least a part of a supporting member which supports the valve seat is disposed in a through hole; and
the valve body has a substantially cylindrical shape, is disposed on an outer side of the vacuum pump portion, and is lifted/lowered along a rotating shaft direction of the vacuum pump portion.

6. The vacuum pump device according to claim 5, wherein
the supporting member penetrates the upper opening portion of the through hole; and
the seal fixedly attaches a wall surface of the upper opening portion to the supporting member.

7. The vacuum pump device according to claim 1, wherein
the valve seat is substantially disc-shaped;
at least a part of a supporting member which supports the valve seat is disposed in the through hole; and
the valve body has a substantially annular shape, is disposed on an outer side of the vacuum pump portion, is lifted/lowered along a rotating shaft direction of the vacuum pump portion, and is brought into contact with the valve seat and an inner wall of a chamber, whereby a channel is closed.

8. The vacuum pump device according to claim 1, wherein
when the lifting-type gate valve portion is in an open state, a channel width between the valve body and the valve seat is substantially uniform in a circumferential direction.

9. A lifting-type gate valve, comprising:
a substantially cylindrical valve body disposed on an outer side of a vacuum pump;
a substantially disc-shaped valve seat at an inlet of the valve; and
a supporting member which supports the valve seat, wherein
at least a part of the supporting member is disposed in a through hole of a stator of the vacuum pump; and
a seal is disposed between the through hole and the inlet and is configured to prevent gas molecules from the inlet from entering the through hole at an upper portion of the through hole.

* * * * *